Dec. 16, 1952      A. E. WELCH      2,622,187
MICROWAVE PRESSURE COOKER
Filed Jan. 14, 1947
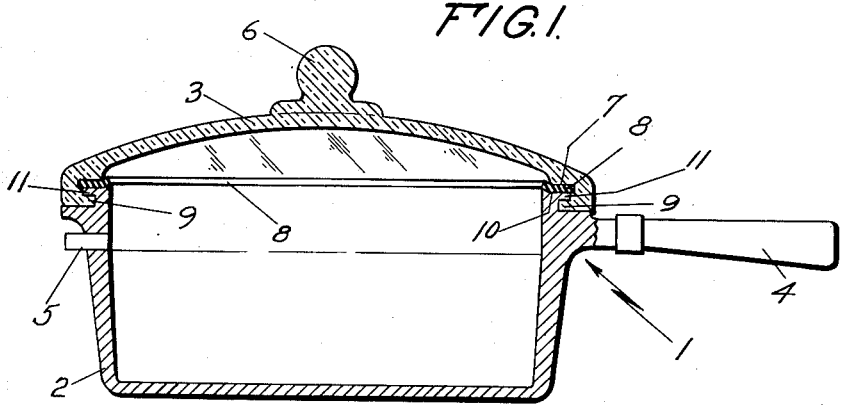
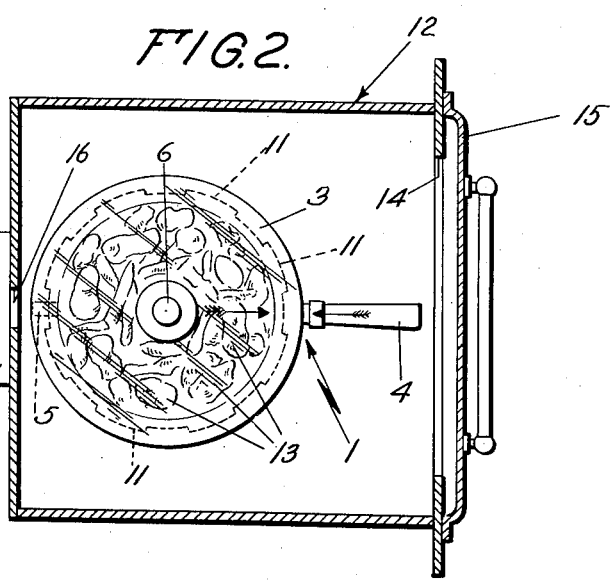
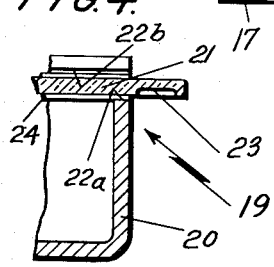
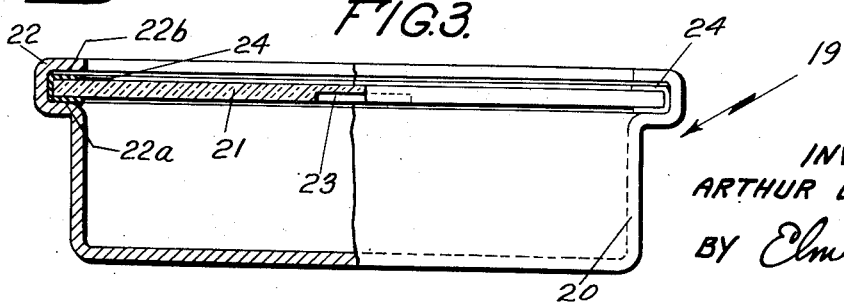
INVENTOR
ARTHUR E. WELCH
BY Elmer J. Gorn
ATTY.

Patented Dec. 16, 1952

2,622,187

UNITED STATES PATENT OFFICE 2,622,187

MICROWAVE PRESSURE COOKER

Arthur E. Welch, Weston, Mass., assignor to Raytheon Manufacturing Company, Newton, Mass., a corporation of Delaware Application January 14, 1947, Serial No. 722,051

3 Claims. (Cl. 219—47)

This invention relates to a method and means for treating foodstuffs, and more particularly to a method and means for accomplishing pressure cooking of foods by means of electromagnetic energy.

An object of this invention is to devise a novel method of cooking.

Another object is to devise a novel apparatus for pressure cooking.

A further object is to devise a means for combining pressure cooking and microwave cooking.

A still further object is to devise a pressure cooker which may be utilized for cooking with electromagnetic energy.

The foregoing and other objects of the invention will be best understood from the following description of some exemplifications thereof, reference being had to the accompanying drawing, wherein:

Fig. 1 is a vertical section through a pressure cooker embodying the invention;

Fig. 2 is a horizontal section through an oven showing the cooker of Fig. 1 being used for cooking purposes;

Fig. 3 is an elevation, partially broken away, of a modified pressure cooker; and Fig. 4 is a fragmentary vertical sectional view of the device of Fig. 3.

Referring now to the drawing, particularly to Fig. 1, the numeral 1 generally designates a pressure cooker or presure cooking vessel according to this invention. Vessel 1 includes a cup-shaped container portion 2, which is adapted to contain foodstuff to be cooked, and a separate cover 3. Container 2 may have an outwardly-extending handle 4 attached thereto, and may have a steam vent 5 therein on the side opposite to said handle, this steam vent having mounted therein any suitable type of pressure-relief valve (not shown).

Cover 3 may have a centrally-located handle 6 integral therewith, and is arranged to be manually brought at will into presure-tight sealing relationship with container 2. For this purpose cover 3 may have a horizontal downwardly-facing planar sealing face 7 on the inside thereof, to which is cemented a suitable sealing gasket 8. Cover 3 is provided with a plurality (here shown as eight) of spaced, circumferentially-arranged inwardly-projecting ledges 9, between which are grooves of approximately the same arcuate length as the ledges, these grooves and ledges being arranged in a horizontal plane spaced below the plane of sealing face 7. Container 2 is provided at its upper end with a horizontal upwardly-facing planar sealing face 10 which is adapted to cooperate with gasket 8 and face 7 of the cover to form a pressure-tight seal therewith. Container 2 has formed therein a plurality of spaced circumferentially-arranged outwardly-projecting ledges 11 which correspond in size, number, and spacing to the ledges 9 of the cover, the plane of ledges 11 and the grooves between the same being substantially that of sealing face 10. When cover 3 is placed on container 2 for sealing purposes, the cover is turned so that the grooves in said cover pass down over the ledges of the container, after which the cover is turned through a small angle with respect to the container to bring the ledges of the cover underneath the ledges of the container, thereby locking the cover on the container and sealing the cover to the container in a pressure-tight manner by means of gasket 8 and sealing faces 7 and 10.

Container 2 is made of a metal having a suitable strength, while cover 3 and handle 6 are made of a material having a suitable strength and at the same time being transparent or permeable to electromagnetic energy, such as quartz or a high-strength glass, for example. Therefore, high-frequency electromagnetic wave energy is capable of passing through cover 3 to the interior of cooker 1.

Now referring to Fig. 2, a hollow enclosure or cavity 12 is made of a suitable metal and has rather thin walls as shown; enclosure 12 is the oven of a microwave (or high-frequency electromagnetic) cooking apparatus. Oven 12 is adapted to have cooker 1, containing food 13, placed therein, said cooker resting on the bottom wall of the oven while the food therein is being cooked. An access opening 14 is provided in the front wall of the oven 12, this opening being closable by means of a metal door 15. When door 15 is closed, enclosure 12 is entirely closed except for a small opening 16, the purpose of which is set forth hereinafter.

One end of the hollow waveguide 17 is coupled to any suitable source of high-frequency electromagnetic energy, for example, a magnetron (not shown), so that high-frequency electromagnetic energy is propagated along guide 17 toward oven 12. The end of guide 17 nearest oven 12 is open and is fastened to the rear wall of said oven by a suitable fastening means 18.

The interior of guide 17 is placed in energy-transmitting relationship with the interior of cavity 12 by means of an aperture 19 provided in the rear wall of said cavity, this aperture being of the same size and configuration as the interior of guide 17 and being aligned with said guide to place the interior of said guide in communication with the interior of cavity 12.

By means of the above-described structure, high-frequency electromagnetic energy, or microwave energy, is fed by waveguide 17 from the high-frequency or microwave source to the interior of oven or cavity 12, so that the interior of said cavity is sealed with high-frequency electromagnetic energy.

When cooker 1 is placed in oven 12, the electromagnetic energy in said oven passes through the cover 3 and handle 6 to the interior of said cooker, since the cover and handle are made of a material which is transparent or permeable to electromagnetic energy. Such energy impinges on food 13 and is absorbed thereby, said energy being converted into heat therein and raising the temperature of said food. As the temperature of the food rises, steam is produced, causing the pressure inside the sealed container or vessel 1 to rise or increase.

From the above description, it will be seen that I have devised a new method of cooking, in which the food is cooked by a combination of pressure cooking and microwave cooking. The pressure vessel 1 is exposed to high-frequency electromagnetic energy in the oven 12 for a period of time sufficient to heat the food to increase the steam pressure in said vessel to a predetermined value, and the cooking of food 13 is then completed by the effect of the steam pressure in said vessel. It has been found that, by this method, food may be cooked extremely rapidly. In addition to the well-known time-saving characteristics of pressure cookers, the time-saving properties of microwave cookers are also provided by means of this invention. Also, since the cooking is carried on in a sealed pressure vessel, no steam or food vapor is permitted to escape from the food, so that the food juices are saved, along with their great nutritive values.

It will therefore be seen that I have devised a rapid and highly efficient cooking process, along with a suitable vessel in which to carry out the process. The pressure vessel 1 is put directly into the microwave oven 12, with a minimum of bother, in order to effectuate my novel combined cooking process.

Now referring to Figs. 3 and 4, which show a modified pressure vessel according to my invention, the numeral 19 generally designates a pressure cooker. Cooker 19 consists of a lower metallic cup-shaped container portion 20, which is adapted to contain foodstuff to be cooked, and a separate cover 21, made of a material transparent to electromagnetic energy, such as quartz or a high-strength glass. Container portion 20 is provided, near its open upper end, with a C-shaped outwardly-projecting rib 22 around three sides thereof, furnishing a lower horizontally-disposed face 22a and an upper horizontally-disposed face 22b.

Cover 21 is mounted for sliding movement on face 22a, and is of such area that, when it is in its sealing position with respect to container 20, a portion of the front end of said cover projects outwardly beyond the front end wall of container 20, as shown in Fig. 4. In this outwardly-projecting portion of cover 21, a recess 23 is provided, this recess opening downwardly as shown in Fig. 4 and being spaced somewhat in back of the vertical front surface of the cover; this recess serves as a convenient handle for manual operation of cover 21 to and from its open and closed positions. Cover 21 is adapted to be slid horizontally back and forth along face 22a, from the side of container 20 not provided with a rib 22, and is adapted to entirely cover said container when said cover is in its rearmost position.

In order to provide a seal between cover 21 and face 22a of container 20, a suitable gasket 24, for example, of C-shaped cross-section, is placed around the edge of cover 21. There is an appreciable space between the upper face of gasket 24 and face 22b of the container.

Pressure vessel 19 is arranged to be a relatively low-pressure device, the weight of cover 21 itself being the only means which positively provides a pressure-tight seal between the cover and the container. When food is placed in pressure vessel 19 and the vessel is placed in a microwave oven, such as oven 12, the electromagnetic energy in the oven passes down through cover 21, which is transparent to such energy, and heats the food therein, producing steam. The steam pressure builds up in vessel 19 until it reaches a predetermined value determined by the weight of cover 21, above which value the pressure forces the cover upwardly until it comes to rest against upper face 22b, thus venting the steam. Thus no special steam vent need be provided, and a predetermined steam pressure is maintained inside vessel 19.

My novel cooking process, which is a combination of pressure cooking and microwave cooking, is capable of utilization with the pressure cooker of Fig. 3, and the advantages of such process, described fully above, are obtainable with the cooker of Fig. 3.

Of course, it is to be understood that this invention is not limited to the particular details as described above, as many equivalents will suggest themselves to those skilled in the art. For example, various other types of fastening means might be used to fasten the cover to the pressure vessel. Also, the steam vent might be located in other positions on the vessel of Fig. 1, for example, in the cover. In addition, the handle 6 could be located in any position other than that shown, if so desired. Various other variations will suggest themselves. It is accordingly desired that the appended claims be given a broad interpretation commensurate with the scope of this invention within the art.

What is claimed is:

1. In combination, an oven comprising a substantially closed metallic cavity, means for energizing said cavity with microwave energy substantially at a resonance condition of said cavity, the dimensions of said cavity being large with respect to the wave length of said energy, a pressure cooker positioned in said oven comprising a cup-shaped element adapted to contain foodstuff, a removable cover element for said first element, means positioned therebetween for sealing said two elements to each other to form a sealed pressure cooker unit, at least one of said elements being made of a material transparent to electromagnetic energy, and a pressure relief vent connected to said pressure cooker and opened in response to a predetermined pressure differential between the interior and exterior of said pressure cooker.

2. In combination, an oven comprising a substantially closed metallic cavity, means for energizing said cavity with microwave energy substantially at a resonance condition of said cavity, the dimensions of said cavity being large with respect to the wave length of said energy, a pressure cooker positioned in said oven comprising a cup-shaped element adapted to contain foodstuff, a removable cover element for said first element, means positioned therebetween for sealing said two elements to each other to form a sealed pressure cooker unit, one of said elements being made of the material transparent to microwave energy and the other of said elements being made of metal, and a pressure relief vent connected to said pressure cooker and opened in response to a predetermined pressure differential between the interior and exterior of said pressure cooker.

3. In combination, an oven comprising a substantially closed metallic cavity, means for energizing said cavity with microwave energy substantially at a resonance condition of said cavity, the dimensions of said cavity being large with respect to the wave length of said energy, a pressure cooker positioned in said oven comprising a cup-shaped element adapted to contain foodstuff, a removable cover element for said first element, means positioned therebetween for sealing said two elements to each other to form a sealed pressure cooker unit, said cover element being made of a material transparent to electromagnetic energy, and a pressure relief vent connected to said pressure cooker and opened in response to a predetermined pressure differential between the interior and exterior of said pressure cooker.

ARTHUR E. WELCH.

REFERENCES CITED

The following references are of record in the file of this patent:

UNITED STATES PATENTS

| Number | Name | Date |
|---|---|---|
| 405,949 | Copelin | June 25, 1889 |
| 736,509 | Eimer | Aug. 18, 1903 |
| 1,059,221 | Saylor | Apr. 15, 1913 |
| 1,183,721 | Bowman | May 16, 1916 |
| 1,227,251 | De Lan | May 22, 1917 |
| 1,230,419 | Lowe | June 19, 1917 |
| 1,730,403 | Boland | Oct. 8, 1929 |
| 1,863,222 | Hoermann | June 14, 1932 |
| 1,946,220 | Lotz | Feb. 6, 1934 |
| 2,148,181 | Andreolo | Feb. 21, 1939 |
| 2,148,822 | Kolouch | Feb. 28, 1939 |
| 2,305,056 | Austin | Dec. 15, 1942 |
| 2,308,603 | Graham | Jan. 19, 1943 |
| 2,378,950 | Reich | June 26, 1945 |
| 2,399,115 | Hansen et al. | Apr. 23, 1946 |
| 2,422,974 | Newell | June 24, 1947 |
| 2,446,605 | Ohlson | Aug. 10, 1948 |
| 2,495,170 | Kinn | Jan. 17, 1950 |
| 2,495,415 | Marshall | Jan. 24, 1950 |
| 2,500,752 | Hanson et al. | Mar. 14, 1950 |
| 2,546,983 | Del Buttero | Apr. 3, 1951 |

FOREIGN PATENTS

| Number | Country | Date |
|---|---|---|
| 7,189 of 1902 | Great Britain | May 15, 1902 |